United States Patent
Ng et al.

(10) Patent No.: US 11,556,207 B2
(45) Date of Patent: Jan. 17, 2023

(54) VIRTUAL DISPLAY TOUCH SCREEN DIAGNOSTIC SYSTEM

(71) Applicant: GM Global Technology Operations LLC, Detroit, MI (US)

(72) Inventors: Pui Ho Ng, Markham (CA); Yvan de Blois, Whitbey (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/348,061

(22) Filed: Jun. 15, 2021

(65) Prior Publication Data
US 2022/0397976 A1    Dec. 15, 2022

(51) Int. Cl.
| | | |
|---|---|---|
| G06F 3/041 | (2006.01) | |
| G06F 3/044 | (2006.01) | |
| G06F 3/04886 | (2022.01) | |
| B60K 35/00 | (2006.01) | |
| B60R 16/023 | (2006.01) | |
| G06F 3/14 | (2006.01) | |

(52) U.S. Cl.
CPC ............ G06F 3/0418 (2013.01); B60K 35/00 (2013.01); B60R 16/023 (2013.01); G06F 3/0446 (2019.05); G06F 3/04886 (2013.01); G06F 3/1423 (2013.01); *B60K 2370/1438* (2019.05); *B60K 2370/152* (2019.05)

(58) Field of Classification Search
None
See application file for complete search history.

(56) References Cited

U.S. PATENT DOCUMENTS

| | | | |
|---|---|---|---|
| 2016/0195931 A1* | 7/2016 | Czelnik | G06F 3/016 345/173 |
| 2016/0299616 A1* | 10/2016 | Crowther | G06F 1/1626 |
| 2018/0343262 A1* | 11/2018 | Anderson | B60R 16/0234 |
| 2020/0104006 A1* | 4/2020 | Rao | G06F 3/0446 |
| 2020/0192546 A1* | 6/2020 | Itou | G06F 3/04886 |
| 2021/0021127 A1* | 1/2021 | Brunier | H02J 3/007 |

* cited by examiner

*Primary Examiner* — Christopher R Lamb
(74) *Attorney, Agent, or Firm* — Vivacqua Crane, PLLC (57) ABSTRACT

An automobile vehicle information system includes a touchscreen having a touchscreen capacitive sensing grid. The touchscreen displays graphics and detects touch events using the touchscreen capacitive sensing grid. A virtual touchscreen and display device is in communication with and receives the touch events detected by the touchscreen via a first digital communication link. The virtual touchscreen and display device generates graphics and maps touch coordinates to intended functions. A location of a failed virtual switch is mapped by the virtual touchscreen and display device based on screen coordinates provided by the touchscreen, the virtual touchscreen and display device generating a switch failure signal identifying the failed virtual switch. A control unit diagnoses the switch failure signal and generates a default action according to a virtual switch type.

15 Claims, 5 Drawing Sheets

VIRTUAL DISPLAY TOUCH SCREEN DIAGNOSTIC SYSTEM

INTRODUCTION

The present disclosure relates to automobile vehicle touch screen displays.

Automobile vehicles commonly use touch screens which an operator directly contacts to set or change preferences, make or change operational controls such as heating and air conditioning control parameters, ride and handling, vehicle performance setting, select audio programs, and the like. Devices such as fully integrated display modules or touchscreens, virtual touchscreen and display devices and control units are normally hardwired to sensors, switches, and other control features which provide communication with the automobile touch screens.

Every trace for a capacitive touch screen in "x" and "y" coordinates is periodically diagnosed for open circuits or short circuit failures. Also, the touchscreen's touch controller, microcontroller, and backlight driver failure data are transmitted to the control unit for diagnosis. There are multiple types of messages that are transmitted through the touchscreen and the virtual touchscreen and display devices periodically, and multiple diagnostic contents to be processed by the control unit periodically. Transmitting this amount of data frequently across a virtual cockpit system to the control unit can easily overload the communication bus. At the same time, the control unit has enormous amounts of data to process to make diagnostic decisions. This leads to a challenge for managing data transmission and data processing.

Thus, while current automobile vehicle virtual display touch screen systems achieve their intended purpose, there is a need for a new and improved system and method for automobile vehicle virtual touch screen display data handling.

SUMMARY

According to several aspects, an automobile vehicle infotainment or information system includes a fully integrated display module or touchscreen having a capacitive sensing grid. The touchscreen displays graphics and detects touch events using the capacitive sensing grid. A virtual touchscreen and display device is in communication with and receives the touch events detected by the touchscreen via a first digital communication link. The virtual touchscreen and display device generates graphics and maps touch coordinates to intended functions. A location of a failed virtual switch is mapped by the virtual touchscreen and display device based on screen coordinates provided by the touchscreen, the virtual touchscreen and display device generating a switch failure signal identifying the failed virtual switch.

In another aspect of the present disclosure, a control unit such as a body control module (BCM) houses control and on-board diagnostic (OBD) functionality. The control unit receives individual button presses from the virtual touchscreen and display device via a controller area network (CAN) bus.

In another aspect of the present disclosure, a control unit and a diagnostic machine are provided, the virtual touchscreen and display device transmitting the switch failure signal to the control unit.

In another aspect of the present disclosure, further including at least one touchscreen internal failure signal transmitted by the virtual touchscreen and display device to the diagnostic machine.

In another aspect of the present disclosure, default action signals are generated by the diagnostic machine, the diagnostic machine receiving the failed switch signal and the internal failure signal from the virtual touchscreen and display device, performing diagnostics and generating the default action signals.

In another aspect of the present disclosure, switch failure statuses, failed and not-failed are collected by the virtual touchscreen and display device and sent out to the control unit.

In another aspect of the present disclosure, identification and diagnostic capabilities include identifying a touchscreen diagnostic content failure including a backlight failure, identifying diagnostic message failures including trace-related failures, touch panel bulk faults, a power failure, a microprocessor failure, a deserializer failure, a digital communication link communication failure and a display module alive rolling count failure.

In another aspect of the present disclosure, a first touchscreen link connects the touchscreen to the virtual touchscreen and display device.

In another aspect of the present disclosure, non-OBD touchscreens are connected to the touchscreen including a first non-OBD touchscreen connected to the touchscreen using a second digital communication link and a second non-OBD touchscreen connected to the first non-OBD touchscreen by a daisy chain digital communication link.

In another aspect of the present disclosure, a central gateway module (CGM) gates messages between the control unit and the virtual touchscreen and display device via the CAN bus.

According to several aspects, an automobile vehicle information system includes a fully integrated display module or touchscreen having a capacitive sensing grid, the touchscreen displaying graphics and detecting touch events using the capacitive sensing grid. A virtual touchscreen and display device is in communication with and receives the touch events detected by the touchscreen via a first digital communication link. The virtual touchscreen and display device generates graphics and maps touch coordinates to at least one or multiple functions. A location of a failed virtual switch is mapped by the virtual touchscreen and display device based on screen coordinates provided by the touchscreen. The virtual touchscreen and display device generates a switch failure signal identifying the failed virtual switch. A control unit which may define a body control module is connected to the virtual touchscreen and display device, the control unit housing control and on-board diagnostic (OBD) functionality.

In another aspect of the present disclosure, an XY coordinate system defines the screen coordinates of a screen of the touchscreen.

In another aspect of the present disclosure, the XY coordinate system includes at least a first X trace and a second Y trace.

In another aspect of the present disclosure, multiple touchscreen failure coordinates are generated by a touchscreen capacitive grid trace row and a grid trace column defining a failure status mapped to a virtual button displayed on the touchscreen.

In another aspect of the present disclosure, a controller area network (CAN) bus is provided, wherein the control unit receives individual button presses from the virtual touchscreen and display device via the (CAN) bus.

In another aspect of the present disclosure, a comparison of failure coordinates to known locations of virtual buttons displayed on a touchscreen of the touchscreen is conducted by the virtual touchscreen and display device.

In another aspect of the present disclosure, a control unit defines a diagnostic machine. The virtual touchscreen and display device transmits the switch failure signal to the diagnostic machine and the virtual touchscreen and display device also transmits a touchscreen internal failure signal to the diagnostic machine. The diagnostic machine receives the switch failure signal and the touchscreen internal failure signal from the virtual touchscreen and display device, performs diagnostics and generates at least one default action signal.

According to several aspects, a method for operating an automobile vehicle information system includes: providing a fully integrated display module or touchscreen having a capacitive sensing grid; operating the touchscreen to display graphics and to detect touch events using the capacitive sensing grid; mapping a location of a failed virtual switch of the touchscreen using a virtual touchscreen and display device based on screen coordinates provided by the touchscreen; and generating a switch failure signal using the virtual touchscreen and display device to identify the failed virtual switch.

In another aspect of the present disclosure, the method further incudes placing the virtual touchscreen and display device in communication with the touchscreen using a first digital communication link to communicate the touch events detected by the touchscreen.

In another aspect of the present disclosure, the method further includes generating graphics using the virtual touchscreen and display device and mapping touch coordinates to functions.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
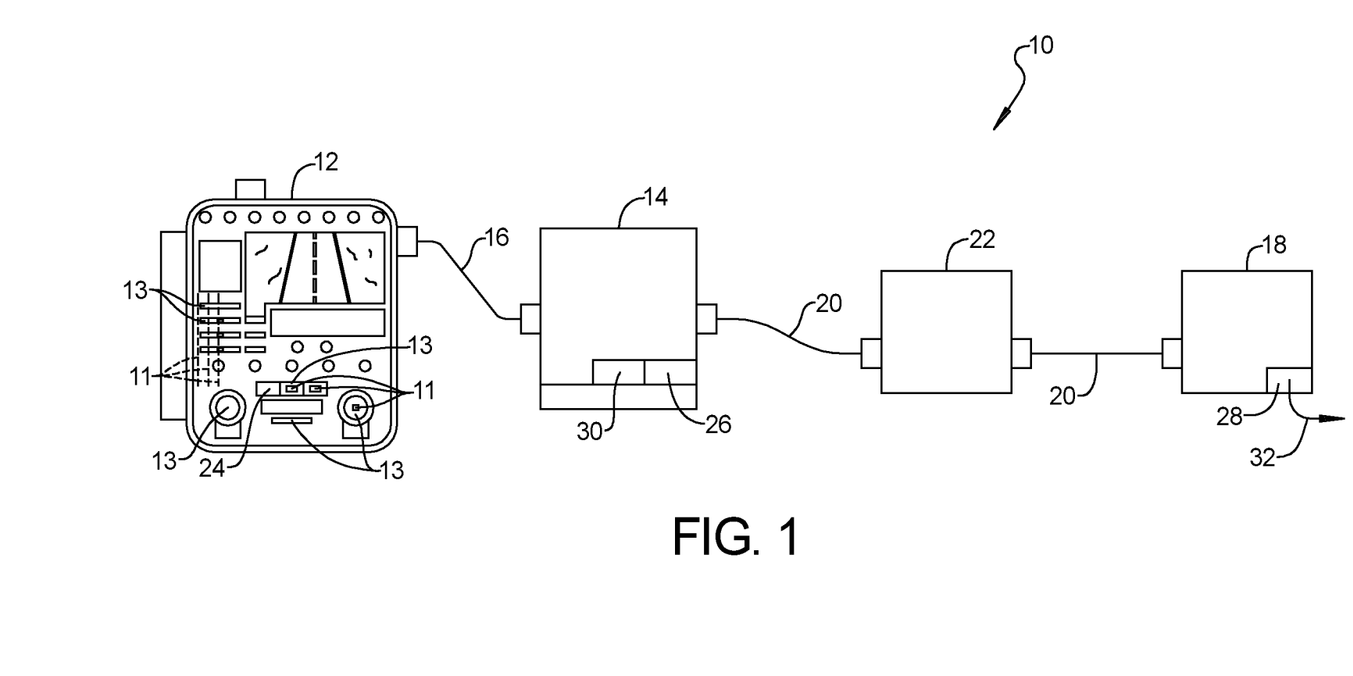
FIG. 1 is a diagrammatic presentation of an information system of an automobile vehicle according to an exemplary aspect.
Figure 2:
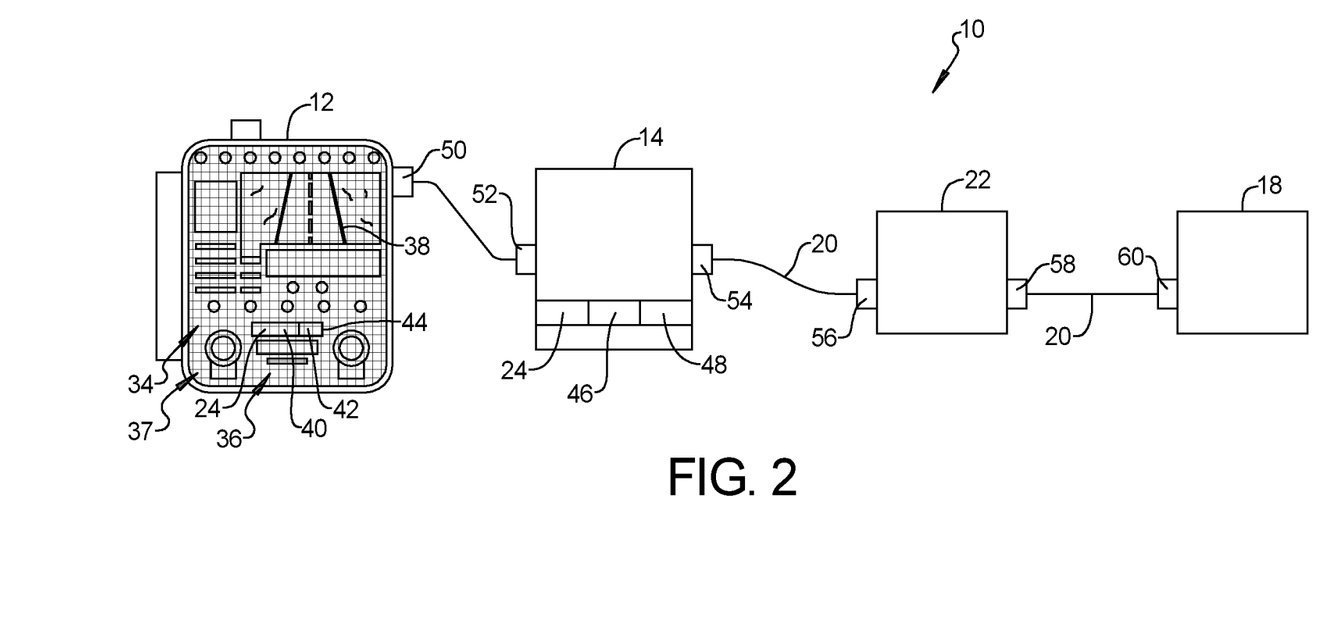
FIG. 2 is a diagrammatic presentation modified from FIG. 1 to present display module traces.

Referring to FIG. 1, an information system 10 of an automobile vehicle includes a touchscreen capacitive sensing grid 11 shown and described in greater detail in reference to FIG. 2 of a fully integrated display module or touchscreen 12 such as a flat panel display which displays graphics, detects touch events using one or multiple capacitive touch traces associated with the touchscreen capacitive sensing grid 11 positioned proximate to multiple virtual switches 13 and communicates the touch events to a virtual touchscreen and display device 14 via a first digital communication link 16. The virtual touchscreen and display device 14 is the "brain" of the information system 10. The virtual touchscreen and display device 14 generates graphics, maps touch coordinates to intended functions and communicates individual button presses to a control unit 18 including for example a body control module via a controller area network (hereinafter CAN) bus 20. A central gateway module (hereinafter CGM) 22 gates relevant messages between the control unit 18 and the virtual touchscreen and display device 14 via the CAN bus 20. The control unit 18 houses control and on-board diagnostic (hereinafter OBD) functionality.

According to several aspects, the virtual touchscreen and display device 14 uses an algorithm to map out a location of a failed virtual switch 24 based on screen coordinates of intersecting ones of multiple traces of the touchscreen capacitive sensing grid 11 provided by the touchscreen 12 and generates a switch failure signal 26 identifying for example the specific failed virtual switch 24. The virtual touchscreen and display device 14 then transmits the switch failure signal 26 to a diagnostic machine 28 within the control unit 18. The virtual touchscreen and display device 14 also transmits any touchscreen 12 internal failure signals 30 to the diagnostic machine 28. The diagnostic machine 28 receives the switch and internal failure signals from the virtual touchscreen and display device 14, performs diagnostics and generates default action signals 32 accordingly.

Referring to FIG. 2 and again to FIG. 1, the touchscreen capacitive sensing grid 11 is represented as intersecting grid lines or traces on the touchscreen 12. A coordinate system identifies an intersection of a vertical one and a horizontal one of any two intersecting grid traces. According to an exemplary operation a first X trace 34 and a second Y trace 36 defining an XY coordinate system 37 of a screen 38 of the touchscreen 12 have a short circuit failure which generate the switch failure signal 26. The touchscreen 12 sends this failure information to the virtual touchscreen and display device 14. In this example the virtual touchscreen and display device 14 maps an XY coordinate defined by an intersection of the first X trace 34 and the second Y trace 36 defining the failed virtual switch 24 to an exemplary OBD related windshield-defogging switch 40. By identifying the failed virtual switch 24 in the virtual touchscreen and display device 14 an operation of sending individual coordinate data to the control unit 18 for subsequent analysis is eliminated, thereby reducing traffic flow via the CAN bus 20. The virtual touchscreen and display device 14 collects and sends out all switch(es) failure statuses, failed and not-failed to the control unit 18. For example, in addition to the failed virtual switch 24 defining the windshield-defogging switch 40, a temperature control switch 42 and a blower control switch 44 are not-failed, therefore the virtual touchscreen and display device 14 also forwards a temperature control switch not-failed signal 46 and a blower control switch not-failed signal 48 to the control unit 18 via the CGM 22.

The control unit 18 diagnoses each failed switch individually using an "X out of Y" analyses, populates fault status flags for each virtual switch, then bundles all of the OBD virtual switch diagnostics results as they mature into a single diagnostic trouble code (DTC).

The information system 10 minimizes total components required to define and analyze failed components, using as a minimum only the two components of the touchscreen 12 and the virtual touchscreen and display device 14. The information system 10 further minimizes total components required to define and analyze failed components in further using the CGM 22 and the control unit 18, for example by eliminating redundant cabling for the OBD switches. The information system 10 therefore also minimizes total connection points required to define and analyze failed components, defining a first connection point 50, a second connection point 52, a third connection point 54, a fourth connection point 56, a fifth connection point 58 and a sixth connection point 60.

Referring to FIG. 3 and again to FIGS. 1 and 2, additional identification and diagnostic capabilities of the information system 10 include identifying a touchscreen diagnostic content failure 62 such as a backlight failure, identifying diagnostic message failures 64 such as trace-related failures, touch panel bulk faults, power failure, microprocessor failure, deserializer failure, digital communication link communication failure and display module alive rolling count failure. The control unit 18 diagnoses issues including a touchscreen display module virtual switch fault 66, a display module bulk touchscreen fault 68, a display module alive rolling count fault 70, a digital communication link communication fault 72 seen by the display module, a virtual touchscreen and display device alive rolling count fault 74 seen by the display device 14, a virtual touchscreen and display device alive rolling count fault 76, a display device loss of communication 78 with the control unit 18, and a control unit loss of communication 80 with the virtual touchscreen and display device 14. A CGM loss of communication 82 with the virtual touchscreen and display device 14 and a CGM loss of communication 84 with the control unit 18 may also be diagnosed by the control unit 18. Display device internal failures 86 such as microprocessor failure, graphics generation failure, link and rolling count seen by the control unit 18 failures may further be diagnosed.

Figure 3:
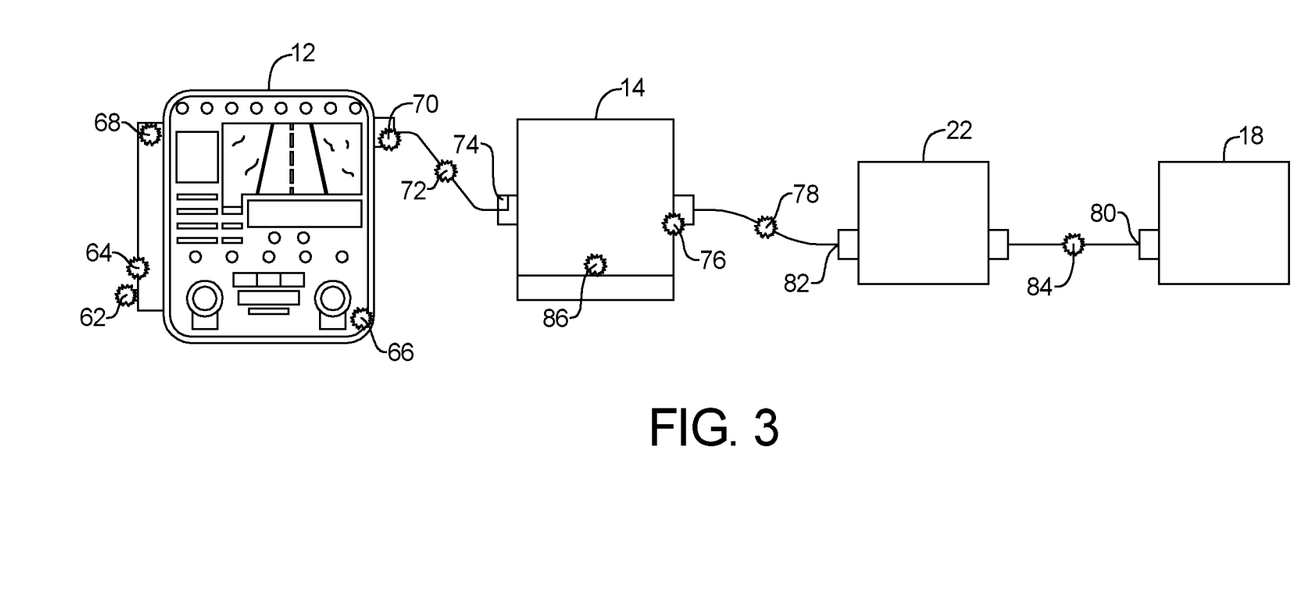
FIG. 3 is a diagrammatic presentation modified from FIG. 1 to present identification and diagnostic capabilities of the information system.
Figure 4:
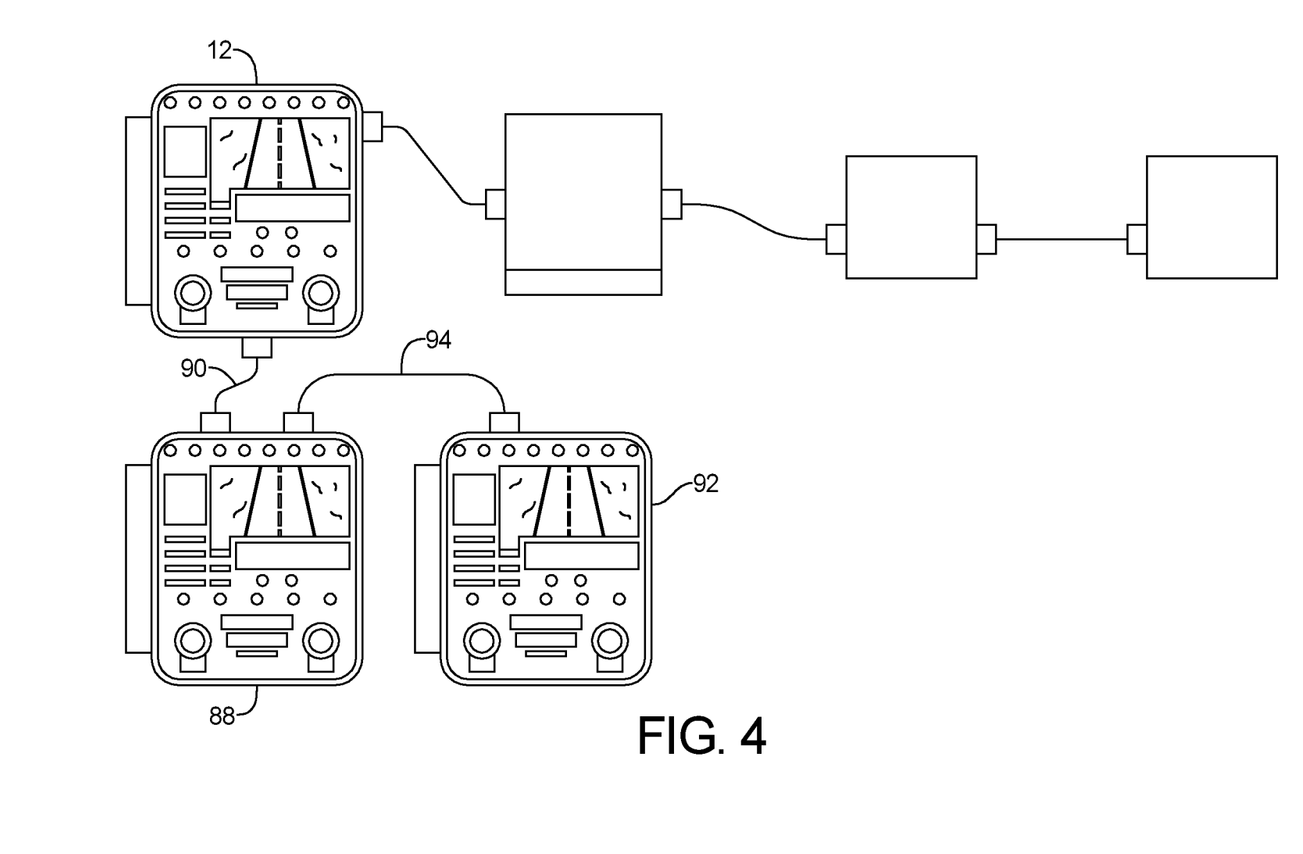
FIG. 4 is a diagrammatic presentation modified from FIG. 1 to present additional non-OBD or OBD fully integrated display modules connected to the information system.

Referring to FIG. 4 and again to FIGS. 1 through 3, additional non-OBD or OBD touchscreens may also be connected to the touchscreen 12 and may therefore be included with and diagnosed by the information system 10. A second touchscreen 88 may be connected to the touchscreen 12 using a second digital communication link 90. A third touchscreen 92 may be connected to the second touchscreen 88 by a daisy chain digital communication link 94. A fourth or more touchscreens (not shown for clarity) may also be added and similarly daisy chained.

Referring to FIG. 5 and again to FIGS. 1 through 4, a flow diagram 96 presents a method for carrying out the process of operation of the information system 10. At a start 98 the system is initiated. At an initial operation 100 capacitive touch sensors of the touchscreen capacitive sensing grid 11 described in reference to FIG. 1 identify occurrence of an electrical fault. In a transmission operation 102 the touchscreen 12 transmits resulting diagnostic fault information including coordinates of any grid failures to the virtual touchscreen and display device 14. This may be approximately 38 bytes of data, however this value is not limiting. In a first decision operation 104 a determination is made if failures are indicated in the diagnostic information provided from the transmission operation 102. If no failure in the transmitted data is indicated from the transmission operation 102, the program continues to a second transmission operation 106 wherein a "No Failure Present" signal for all virtual button diagnostic failure statuses is forwarded to the control unit 18 and the program continues to a processing operation 108. In the processing operation 108 the control unit 18 processes all failure statuses including failure present, failure not present, and indeterminate statuses using an "X" out of "Y" diagnostic on a button-by-button basis. Following the processing operation 108 the program ends at a end stage 110.

Figure 5:
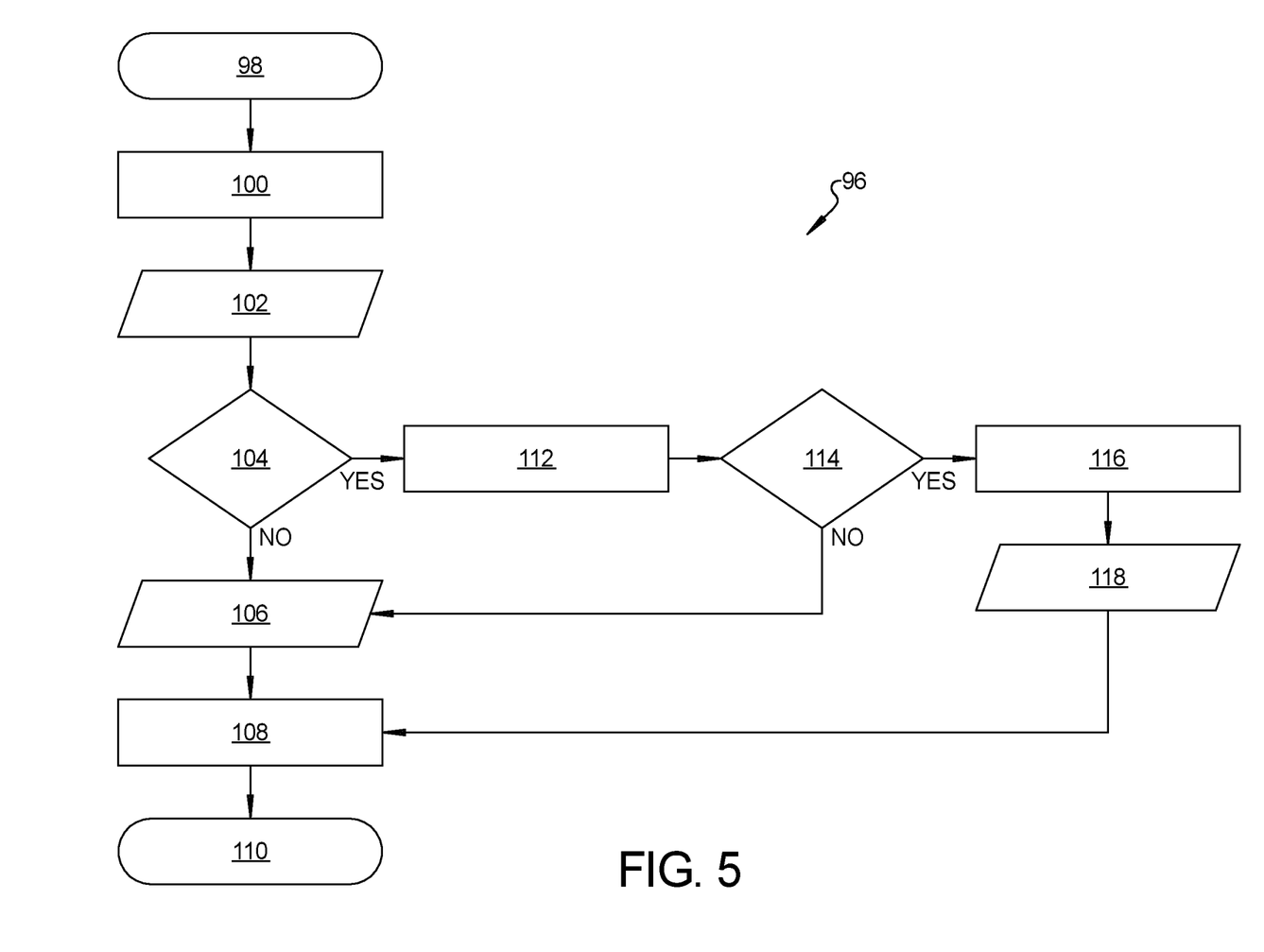
FIG. 5 is a flow diagram of method steps for operation of the information system of FIG. 1.

In the first decision operation 104 if a YES determination is made that failures ARE indicated in the diagnostic information provided from the transmission operation 102 the program continues to a comparison operation 112 wherein a comparison of failure coordinates to known locations of virtual buttons displayed in the touchscreen is conducted. Following the comparison operation 112 the program continues to a second decision operation 114 wherein a decision is made if any coordinates of the identified grid failures correspond to a virtual button of the display. If during the second decision operation 114 no coordinates of the identified grid failures correspond to any virtual button, the program continues to the second transmission operation 106.

If during the second decision operation 114 coordinates of the identified grid failures are identified which correspond to one or more virtual buttons, the program continues to an assigning operation 116 wherein a failure status of a "Failure Present" is assigned to any impacted virtual button on a virtual button-to-button basis. Following the assigning operation 116 the program moves to a transmission operation 118 wherein the virtual touchscreen and display device 14 transmits all virtual button diagnostic failure statuses including any "Failure Present" status for impacted virtual buttons to the control unit 18, after which the program continues to the processing operation 108.

An information system of the present disclosure provides multiple benefits compared to conventional OBDII switch systems. These include:

Reduction of complexity The present system requires fewer connections and parts. Conventional OBDII systems require hardwired connections directly to the diagnostic machine 28 and to the control unit 18. In the information system 10 of the present disclosure, the CGM 22 is utilized as a communication hub to transmit signals through the CAN bus 20 and uses the control unit 18 to diagnose problems.

Faster response time: The virtual touchscreen and display device 14 takes on some tasks for the control unit 18 and thereby reduces a control unit 18 processing burden by processing touch information for the control unit 18. The virtual touchscreen and display device 14 is the optimum positioned component for touch coordinate mapping to a switch.

Emissions Reduction: The virtual touchscreen and display device 14 may for example identify a failed virtual switch that is emissions related, and the control unit 18 may then execute default actions to reduce emissions impact.

Expandability: System layout flexibility is enhanced for a user experience team to locate OBD or non-OBD switches over touch displays.

Improved Fuel Economy: In case of OBD virtual switch (Driver Mode/heating ventilation air conditioning (HVAC)) failure, the system sets a default action to minimize a fuel impact.

An information system of the present disclosure provides a virtual switch diagnostic strategy and system which reduces bus data traffic, utilizes data processing power across electronic control units, simplifies interfaces and parts, and provides flexibility for virtual switch design while meeting On-Board Diagnostic II (OBDII) regulations if required by the implementation. In case of any touch screen failure, the diagnostic system identifies the affected virtual switch function(s) and performs cybersecurity, emissions controls and safety default actions accordingly.

The algorithm translates and reduces large amounts of diagnostic data originating from the touchscreen such as capacitive touch grid failures into a minimum dataset. This is accomplished by deriving touchscreen failure coordinates from the touchscreen capacitive grid trace row such as the row or the first X trace 34 and column such as the column or second Y trace 36 failure status information and mapping these to the impacted virtual button(s) such as the failed switch 24 displayed on the touchscreen.

Individual failure statuses which reflect the instantaneous state of the virtual button are then communicated on a button-by-button basis to a downstream electronic control unit ECU for processing in a diagnostic which satisfies on-board diagnostic OBD-II regulatory and system safety requirements.

An information system of the present disclosure offers several advantages. These include provision of an algorithm that maps out coordinates of the OBD-II virtual switch on-screen and transmits a failure signal of the switch if a mapped touch screen trace has failed. The present system also applies to safety virtual switches.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An automobile vehicle information system, comprising:
   a first touchscreen having a touchscreen capacitive sensing grid, the first touchscreen having graphics displays and touch event detection using the touchscreen capacitive sensing grid;
   a first digital communication link;
   a second digital communication link which is a Controller Area Network (CAN) bus;
   a virtual touchscreen and display device in communication with and receiving touch events detected by the first touchscreen using the first digital communication link, wherein the virtual touchscreen and display device generates graphics, maps touch coordinates to intended functions, maps a location of a failed virtual switch based on screen coordinates provided by the first touchscreen, and generates a switch failure signal identifying the failed virtual switch; and
   a control unit in communication with the virtual touchscreen and display device using the second digital communication link, wherein the control unit includes control and on-board diagnostic (OBD) functionality and a diagnostic machine, wherein the control unit receives at least: individual button presses, the switch failure signal, and a touch screen internal failure signal from the virtual touchscreen and display device, wherein the control unit does not receive individual coordinate data from the virtual touchscreen and display device, and
   wherein the virtual touchscreen and display device collects a plurality of switch failure signals and transmits each of the plurality of switch failure signals to the control unit.

2. The automobile vehicle information system of claim 1, further including default action signals generated by the diagnostic machine, the diagnostic machine receiving the switch failure signal and the touchscreen internal failure signal from the virtual touchscreen and display device, performing diagnostics and generating the default action signals.

3. The automobile vehicle information system of claim 1, further including switch failure statuses, failed and not-failed, being collected by the virtual touchscreen and display device and sent out to the control unit.

4. The automobile vehicle information system of claim 1, further including a second touchscreen connected to the first touchscreen using a second digital communication link and a third touchscreen connected to the second touchscreen by a daisy chain digital communication link.

5. The automobile vehicle information system of claim 1, further including a central gateway module (CGM) gating messages between the control unit and the virtual touchscreen and display device via the CAN bus.

6. An automobile vehicle information system, comprising:
   a touchscreen having a touchscreen capacitive sensing grid, the touchscreen providing graphics displays and touch events detection using the touchscreen capacitive sensing grid;
   a virtual touchscreen and display device in communication with and receiving the touch events detected by the touchscreen via a first digital communication link, the virtual touchscreen and display device generating graphics and mapping touch coordinates to intended functions;
   a control unit connected to the virtual touchscreen and display device, wherein the control unit includes control and on-board diagnostic (OBD) functionality and a diagnostic machine; and
   a location of a failed virtual switch mapped by the virtual touchscreen and display device based on screen coordinates provided by the touchscreen, the virtual touchscreen and display device generating a switch failure signal identifying the failed virtual switch and transmitting at least the switch failure signal and individual button presses to the diagnostic machine in the control unit, wherein the virtual touchscreen and display device does not transmit individual coordinate data to the diagnostic machine in the control unit.

7. The automobile vehicle information system of claim 6, including an XY coordinate system defining the screen coordinates of the touchscreen.

8. The automobile vehicle information system of claim 7, wherein the XY coordinate system includes at least a first X trace and a second Y trace.

9. The automobile vehicle information system of claim 6, including multiple touchscreen failure coordinates generated by a touchscreen capacitive grid trace row and a grid trace column defining a failure status mapped to a virtual button displayed on the touchscreen.

10. The automobile vehicle information system of claim 6, including a controller area network (CAN) bus, wherein the control unit receives individual button presses from the virtual touchscreen and display device via the CAN bus.

11. The automobile vehicle information system of claim 6, wherein a comparison of failure coordinates to known locations of virtual buttons displayed on the touchscreen is conducted by the virtual touchscreen and display device.

12. The automobile vehicle information system of claim 6, wherein the diagnostic machine performs diagnostics and generates at least one default action signal.

13. A method for operating an automobile vehicle information system, comprising:

providing a touchscreen having a touchscreen capacitive sensing grid;

operating the touchscreen to display graphics and to detect touch events using the touchscreen capacitive sensing grid;

mapping a location of a failed virtual switch of the touchscreen using a virtual touchscreen and display device based on screen coordinates provided by the touchscreen;

generating a switch failure signal using the virtual touchscreen and display device to identify the failed virtual switch;

transmitting at least the switch failure signal to a diagnostic machine in a control unit, wherein individual coordinate data are not transmitted to the diagnostic machine in the control unit;

receiving the switch failure signal from the virtual touchscreen and display device using the diagnostic machine; and performing diagnostics of the touchscreen based on the switch failure signal using the diagnostic machine.

14. The method of claim 13, further including placing the virtual touchscreen and display device in communication with the touchscreen using a first digital communication link to communicate the touch events detected by the touchscreen.

15. The method of claim 13, further including generating graphics using the virtual touchscreen and display device and mapping touch coordinates to at least one of multiple functions.

* * * * *